US009387819B2

(12) United States Patent
Fürst

(10) Patent No.: US 9,387,819 B2
(45) Date of Patent: Jul. 12, 2016

(54) METHOD AND DEVICE FOR CONTROLLING A SEAT BELT DEVICE, WHICH IS CONNECTED TO A SEAT BELT, OF A VEHICLE WITH A PREDICTIVE COLLISION DETECTION UNIT

(71) Applicant: AUDI AG, Ingolstadt (DE)

(72) Inventor: Franz Fürst, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/443,018

(22) PCT Filed: Nov. 8, 2013

(86) PCT No.: PCT/EP2013/003372
§ 371 (c)(1),
(2) Date: May 14, 2015

(87) PCT Pub. No.: WO2014/075783
PCT Pub. Date: May 22, 2014

(65) Prior Publication Data
US 2015/0298636 A1    Oct. 22, 2015

(30) Foreign Application Priority Data

Nov. 15, 2012   (DE) .......................... 10 2012 022 392

(51) Int. Cl.
*G06F 17/10* (2006.01)
*B60R 21/0134* (2006.01)
(Continued)

(52) U.S. Cl.
CPC ......... *B60R 21/0134* (2013.01); *B60R 21/0132* (2013.01); *B60R 21/01542* (2014.10); *B60R 22/00* (2013.01); *B60R 2021/01272* (2013.01); *B60R 2021/01279* (2013.01)

(58) Field of Classification Search
CPC .............. B60R 21/0134; B60R 21/013; B60R 2021/01034; B60R 2021/01279; B60R 2021/01313
USPC ........................................ 701/301, 45, 96, 46
See application file for complete search history.

(56) References Cited

U.S. PATENT DOCUMENTS 6,085,151 A * 7/2000 Farmer ..................... G01S 7/023
342/70
6,199,903 B1 * 3/2001 Brambilla ......... B60R 21/01558
280/728.1
(Continued)

FOREIGN PATENT DOCUMENTS

DE           160518       5/1905
DE          19816989     11/1999
(Continued)

OTHER PUBLICATIONS

International Search Report issued by the European Patent Office in International Application PCT/EP2013/003372.

*Primary Examiner* — Redhwan k Mawari
(74) *Attorney, Agent, or Firm* — Henry M. Feiereisen LLC.

(57) ABSTRACT

A method and a device for controlling a seat belt device, which is connected to a seat belt, of a vehicle with a collision detection unit having sensor units for detecting an imminent collision with a collision object external to the vehicle includes classifying the collision object in terms of an object class and a weight class with an object identification unit, determining a value for an accident severity of the imminent collision at least from the object class, the weight class and the speed of the collision object, and from the speed and the mass of the vehicle. The maximum initial forward displacement of a vehicle occupant is determined with forward displacement sensors, and the seat belt device is activated depending on the determined value of the accident severity and the maximum initial forward displacement

12 Claims, 1 Drawing Sheet

(51) Int. Cl.
*B60R 21/0132* (2006.01)
*B60R 21/015* (2006.01)
*B60R 22/00* (2006.01)
*B60R 21/01* (2006.01)

(56) References Cited

U.S. PATENT DOCUMENTS

| | | | |
|---|---|---|---|
| 7,735,859 B2 * | 6/2010 | Lenning | B60R 21/013 180/268 |
| 8,991,545 B2 | 3/2015 | Fürst | |
| 2002/0134607 A1 * | 9/2002 | Recknagel | B60R 21/013 180/274 |
| 2003/0105569 A1 * | 6/2003 | Roelleke | B60R 21/0132 701/45 |
| 2004/0061598 A1 * | 4/2004 | King | B60R 21/013 340/435 |
| 2004/0216939 A1 * | 11/2004 | Lorenz | B60R 21/015 180/268 |
| 2013/0054093 A1 | 2/2013 | Fürst et al. | |
| 2014/0100742 A1 | 4/2014 | Fürst et al. | |

FOREIGN PATENT DOCUMENTS

| | | |
|---|---|---|
| DE | 10065518 | 7/2002 |
| DE | 10100880 | 7/2002 |
| DE | 10123921 | 1/2003 |
| DE | 10345726 | 4/2005 |
| DE | 102005033337 | 1/2007 |
| DE | 102005052266 | 5/2007 |
| WO | WO2007/003471 | 1/2007 |

* cited by examiner

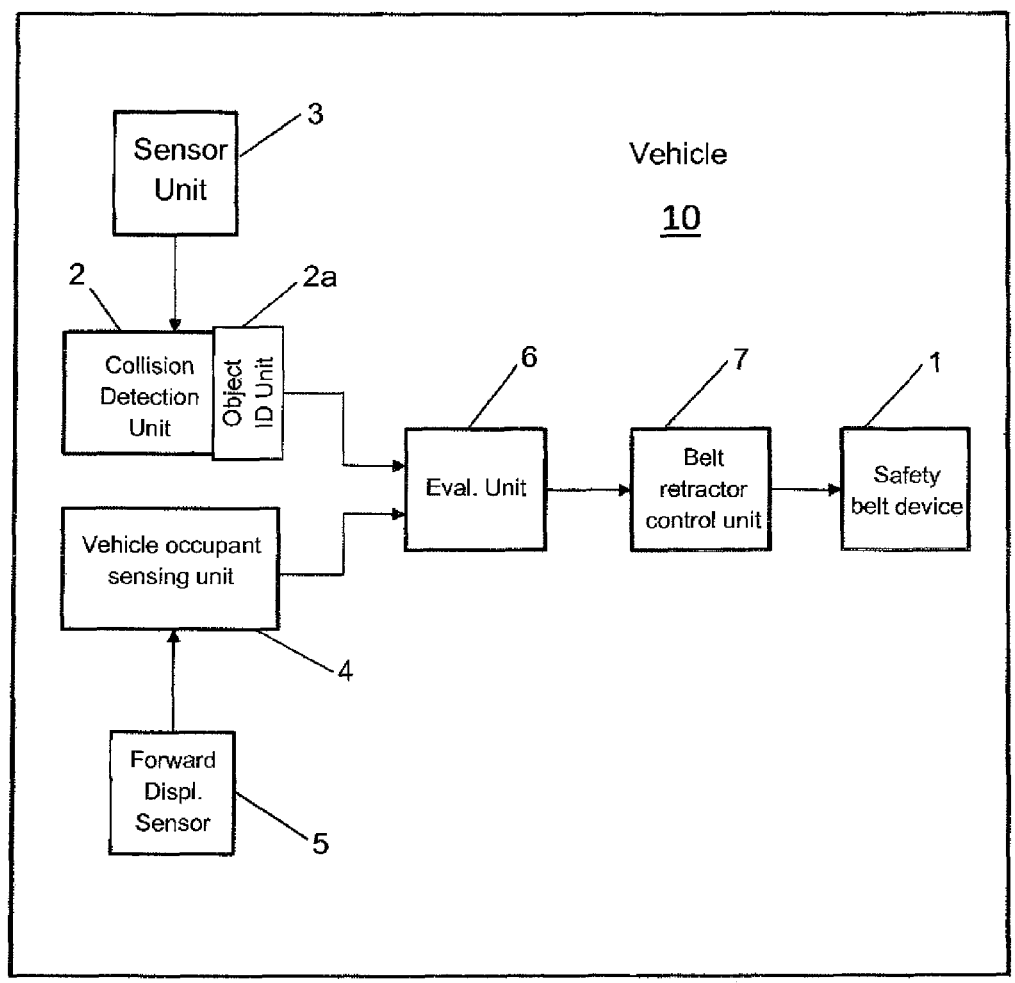

METHOD AND DEVICE FOR CONTROLLING A SEAT BELT DEVICE, WHICH IS CONNECTED TO A SEAT BELT, OF A VEHICLE WITH A PREDICTIVE COLLISION DETECTION UNIT

CROSS-REFERENCES TO RELATED APPLICATIONS

This application is the U.S. National Stage of International Application No. PCT/EP2013/003372, filed Nov. 8, 2013, which designated the United States and has been published as International Publication No. WO 2014/075783 and which claims the priority of German Patent Application, Serial No. 10 2012 022 392.7, filed Nov. 15, 2012, pursuant to 35 U.S.C. 119(a)-(d).

BACKGROUND OF THE INVENTION

The invention relates to a method of controlling a seat belt device, which is connected to a seat belt, of a vehicle with a collision detection unit that includes sensor units for detecting an imminent collision with a vehicle-external collision object. The invention also relates to a device for performing the method according to the invention.

U.S. Pat. No. 6,085,151 B describes a generic method, with which an object that is expected to collide with a vehicle can be detected with a predictive collision detection unit of the vehicle collision of before an actual crash. The time until impact with the collision object is estimated, the type of the accident is identified and the severity of the accident is estimated and used, for example, to control a belt tensioner and to thereby increase the safety of vehicle occupants. However, it is not described how the severity of the accident is determined.

Furthermore, DE 103 45 726 A1 discloses a restraint system for restraining an occupant in a motor vehicle and a method for dynamically controlling such a restraint system. In this known method, the vehicle situation is determined with a situation detection device and the parameter data of the occupants are determined with a parameter detection device, wherein the force of the seatbelt tensioner is dynamically controlled commensurate with the situation by a control unit and by taking into account the vehicle situation and the parameters of the occupants. The force of the belt tensioner applied to the seatbelt can thus be actively controlled before or during an accident and can thus be adapted to the current vehicle situation and occupants' situation, for example, the occupants' position and weight. Furthermore, when a high hazard potential is detected, the force of the belt tensioner can be increased and the force of the belt tensioner can subsequently be reduced again when the danger has abated and the risk potential has diminished. The situation detection device of this conventional restraint system is configured as an environment sensor system for monitoring the environment of the vehicle, for example relevant accident objects. Using these environment sensors, the impact velocity, the impact time, the impact angle, the impact location and the impact overlap can be determined. In addition, the situation detection device can also be configured as an accident sensor system for detecting the accident acceleration, the accident severity, the accident type, or the like. These data can then be taken into account in the dynamic control of the force of the belt tensioner.

The parameter detection device for determining the parameter of the occupants is in this conventional restraint system configured as an occupant sensor system for determining the occupants' position, the occupants' weight, the occupants' size, the seat position, the seat belt extension length or the like. Furthermore, the hazard potential is determined from the data captured, for example, in a pre-crash phase, and the survival space between the occupant and for example the air bag is determined in a crash phase, and the force of the belt tensioner is dynamically controllable so that the entire available survival space of the occupant is utilized. The survival space is here the space between the occupant and a possible object, for example an airbag, a steering wheel or a glove compartment, which the occupant may strike. The publication DE 03 45 726 A1 does not disclose how the risk potential is determined in the pre-crash phase.

SUMMARY OF THE INVENTION

Starting from this prior art, it is an object of the invention to further develop the aforementioned method so that the belt tensioner can already be controlled before the accident phase, depending on the severity of an imminent collision, by taking advantage of the maximum initial forward displacement. It is also an object of the invention to provide a device for carrying out the method according to the invention.

A method of controlling a seat belt device connected to a seat belt of a vehicle having a collision detection unit which includes sensor units for detecting an imminent collision with a collision object external to the vehicle, is characterized according to the invention in that
- the collision object is classified by an object detection unit in terms of an object class and a weight class,
- a value for a severity of an imminent collision is determined at least from the object class of the collision object, its weight class and its speed, on the one hand, and the speed and the vehicle mass of the vehicle, on the other hand,
- the maximum initial forward displacement a vehicle occupant is determined by an initial forward displacement sensor, and
- the safety belt device is activated depending on the value of the severity of the accident and the determined maximum initial forward displacement.

The belt loads of the vehicle occupant are minimized by using the maximum possible initial forward displacement for the vehicle occupants depending on the value of the determined accident severity.

According to an embodiment of the invention, the time of a collision is determined by the collision detection unit, the speed of the collision object and the speed of the vehicle at the time of the collision are estimated, and the value of the severity of the accident at the time of the collision is determined. This leads to improved control of the belt tensioner to minimize the occupant load in the accident phase.

According to another embodiment of the invention, it is particularly advantageous to determine the severity in proportion to the relative speed of the vehicle and of the collision object. Preferably, the severity of the accident is additionally determined in proportion to the sum of the kinetic energy of the vehicle and of the collision partner. This produces a measure for the severity of the imminent collision that essentially corresponds to the actual severity of the imminent collision.

According to another embodiment of the invention, the seat belt device is controlled at least as a function of the relative speed of the vehicle and the collision object and the initial forward displacement.

Preferably, the safety belt device is constructed with a belt tensioner and belt force limiter or a belt retractor control actuator, wherein in accordance with an improvement the belt tensioner is controlled to reduce slack when an imminent collision is detected.

According to one embodiment, the belt force limiter is controlled as a function of the value of the severity of the accident and the determined maximum initial forward displacement, wherein in a particularly advantageous improvement the belt force limiter may also be controlled as a function of the applied belt force or the belt retractor control actuator may also be controlled as a function of a parameter.

According to another embodiment, the belt retractor control actuator is controlled as a function of the value of the severity of the accident and of the determined maximum initial forward displacement, wherein in a particularly advantageous embodiment the belt retractor control actuator is controlled such that just enough belt extension is permitted at the end of the collision so that the available maximum initial forward displacement is almost or completely attained.

A device for controlling a seat belt device, which is connected to a seat belt, of a vehicle has a collision detection unit that includes sensor units for detecting an imminent collision with a collision object external to the vehicle, is characterized according to the invention in that an object detection unit for classifying the collision object in terms of an object class and a weight class is provided, the collision detection unit is configured to determine a value for a severity of the imminent collision at least from the object class of the collision object, its weight class and its speed, on the one hand, and from the speed and the vehicle mass of the vehicle, on the other hand, a vehicle occupant detection unit is provided, which determines the maximum initial forward displacement of a vehicle occupant, and an evaluation unit (6) is provided for controlling the seatbelt device as a function of the value of the severity of the accident and of the determined maximum initial forward displacement.

According to one embodiment of the invention, the seat belt device includes a belt tensioner to reduce slack and a belt force limiter or a belt retractor control actuator. A belt retractor control unit is provided to control the belt force limiter or the belt retractor control actuator as a function of the value of the severity of the accident and the determined maximum initial forward displacement. In addition, this belt retractor control unit may also control the belt force limiter as a function of the applied belt force. In addition, this belt retractor control unit may also control the belt retractor control actuator as a function of a parameter.

This device also has the advantages described in conjunction with the method according to the invention.

BRIEF DESCRIPTION OF THE DRAWING

The invention will now be described in detail by way of example with reference to a drawing wherein FIG. 1 shows a block diagram of a device for carrying out the method according to the invention.

DETAILED DESCRIPTION OF PREFERRED EMBODIMENTS

This device for controlling a seat belt device 1, which is connected to a seat belt, of a vehicle 10 is illustrated schematically in FIG. 1 and includes a collision detection unit 2 with an object detection unit 2a, which are supplied with sensor signals from sensor units 3.

Furthermore, a vehicle occupant detection unit 4 is provided which determines with an initial forward displacement sensor 5 an initial forward displacement of a vehicle occupant. The initial forward displacement is the distance between the occupant and the steering wheel, the glove compartment or the instrument panel of the vehicle 10.

An evaluation unit 6 evaluates the signals received from the collision detection unit 2 and the initial forward displacement sensor 5 and supplies the results of the evaluation to a belt retractor control unit 7, which in turn controls the seat belt device 1. This seat belt device 1 includes a belt tensioner to reduce slack in the event of a detected imminent collision and a belt force limiter or a belt retractor control actuator.

The collision detection unit 2 detects an object in the environment of the vehicle 10, with which the vehicle 10 will collide. To determine the severity of the imminent collision, an object class is associated with the collision object by an object detection unit 2a of this collision detection unit 2. Object classes are defined to include passenger cars, trucks, bicyclists or pedestrians.

Furthermore, weight classes are associated with the objects of an object class, for example, a range of values for the weight of the objects of an object class or a maximum weight value. For example, a maximum value of 150 kg may be assigned to a pedestrian and a bicyclist, whereas a range of values between 800 kg and 2500 kg may be assigned to a passenger car.

Furthermore, the time of the collision is estimated with the collision detection unit 2, and the speed of the collision object and the speed of the vehicle 10 at the time of the collision are determined.

The severity of the imminent collision is determined from these data and from the vehicle weight of the vehicle 10 and the relative speed between the vehicle 10 and the collision object, under the assumption that the kinetic energy of both the vehicle 10 and the collision object is completely dissipated during the crash.

The severity of the accident depends proportionally on the relative speed $\Delta v$ between the vehicle 10 and the collision object and on the sum of the kinetic energy of the vehicle 10 and the collision object. This produces for a measure of the severity of the imminent collision that substantially corresponds to the actual severity of the imminent collision.

The severity of an accident can be determined in more detail by using assumptions regarding the stiffness of the vehicle 10 and the collision partner, and with knowledge of the directions of the involved speeds and the degree of overlap in the collision.

Alternatively, the severity of an accident can be determined by assuming that the collision object has an infinite stiffness and an infinite mass, so that a collision with these assumptions would correspond to an impact of the vehicle on a rigid wall.

The value of the severity of the accident and the maximum initial forward displacement determined by the vehicle occupant detection unit 4 with the initial forward displacement sensor is supplied to the evaluation unit 6 for determining, based on these data, a parameter for optimal control of the seatbelt device 1.

For this purpose, it is assumed that the delay "a" occurring during the collision and permitted by the belt force limiter or by the belt retractor control actuator of the seatbelt device 1 is constant. The delay "a" is then determined by using the value $s_0$ of the maximum initial forward displacement and the relative speed $\Delta v$ characterizing the severity of the accident according to the following formula:

$$a = \Delta v/(2s_0).$$

With this value "a" as a parameter, the belt force limiter or the belt retractor control actuator of the seatbelt device 1 is controlled by the evaluation unit 6 so that the force of the seat belt acting on the vehicle occupant has a value that takes advantage of the maximum displacement, thus always generating a minimum load for the vehicle occupant commensurate with the severity of the accident. In other words, just enough belt extension was permitted at the end of the collision so as to attain nearly or completely the maximum available initial forward displacement.

The parameter can also additionally take into account the applied belt force and other variables.

What is claimed is:

1. A method of controlling a seat belt device, which is connected to a seat belt, of a vehicle having a collision detection unit, which comprises sensor units for detecting an imminent collision with a collision object external to the vehicle, the method comprising:
   classifying the collision object with an object detection unit with respect to an object class and a weight class,
   determining a value for a severity of an imminent collision at least from the object class of the collision object, a weight class of the collision object and a speed of the collision object, on the one hand, and from a speed and a vehicle mass of the vehicle, on the other hand,
   determining with an initial forward displacement sensor a maximum initial forward displacement of a vehicle occupant, and
   controlling the seat belt device depending on a value of the severity of the accident and the determined maximum initial forward displacement.

2. The method of claim 1, further comprising:
   estimating with the collision detection unit a time of the collision,
   determining the speed of the collision object and the speed of the vehicle at the time of the collision, and
   determining the value of the severity of the accident at the time of the collision.

3. The method of claim 1, wherein the severity of the accident is determined in proportion to a relative speed of the vehicle and the collision object.

4. The method of claim 1, wherein the severity of the accident is determined in proportion to a sum of a kinetic energy of the vehicle and the collision object.

5. The method of claim 3, wherein the seat belt device is controlled at least as a function of the relative speed of the vehicle and the collision object and the initial forward displacement.

6. The method of claim 1, wherein the seat belt device is formed with a belt tensioner and belt force limiter or a belt retractor control actuator.

7. The method of claim 6, and further controlling the belt tensioner in an imminent collision so as to reduce slack.

8. The method of claim 5, and further controlling the belt force limiter or belt retractor control actuator as a function of the value of the severity of the accident and of the determined maximum initial forward displacement.

9. The method of claim 8, and further controlling the belt force limiter as a function of an applied belt force.

10. The method of claim 8, and further controlling the belt retractor control actuator as a function of a parameter selected from an applied belt force and a permissible belt extension at the end of the collision.

11. A device for triggering a seat belt device, which is connected to a seat belt, of a vehicle, comprising:
    a collision detection unit comprising a sensor unit configured to detect an imminent collision with a collision object external to the vehicle,
    an object detection unit configured to classify the collision object in terms of an object class and a weight class,
    wherein the collision detection unit is configured to determine a value for a severity of the imminent collision at least from the object class of the collision object, a weight class of the collision object and a speed of the collision object, on the one hand, and from a speed and a vehicle mass of the vehicle, on the other hand,
    a vehicle occupant sensing unit configured to determine a maximum initial forward displacement of a vehicle occupant, and
    an evaluation unit configured to control the seatbelt device as a function of the value of the severity of the collision and of the determined maximum initial forward displacement.

12. The device of claim 11, wherein the seat belt device comprises
    a belt tensioner and a belt force limiter or a belt retractor control actuator, and
    a belt retractor control unit controlling the belt force limiter or the belt retractor control actuator.

* * * * *